US012019383B2

(12) United States Patent
Sato et al.

(10) Patent No.: US 12,019,383 B2
(45) Date of Patent: Jun. 25, 2024

(54) IMAGE FORMING APPARATUS INCLUDING RECIPROCATABLE FIXING UNIT NEXT TO HEATING UNIT

(71) Applicant: KYOCERA Document Solutions Inc., Osaka (JP)

(72) Inventors: Takehiro Sato, Osaka (JP); Keiju Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/180,779

(22) Filed: Mar. 8, 2023

(65) Prior Publication Data

US 2023/0288848 A1 Sep. 14, 2023

(30) Foreign Application Priority Data

Mar. 10, 2022 (JP) ................................ 2022-036974

(51) Int. Cl.
*G03G 15/20* (2006.01)
*G03G 21/16* (2006.01)
*H05B 6/14* (2006.01)

(52) U.S. Cl.
CPC ..... *G03G 15/2017* (2013.01); *G03G 15/2053* (2013.01); *G03G 15/2064* (2013.01); *G03G 21/1685* (2013.01); *H05B 6/145* (2013.01); *G03G 2215/2038* (2013.01)

(58) Field of Classification Search
CPC ........... G03G 15/2053; G03G 15/2017; G03G 15/2064; G03G 15/2032; G03G 21/6133; G03G 21/1685; G03G 2215/2003; G03G 2221/1639; G03G 2215/2038; H05B 6/145
See application file for complete search history.

(56) References Cited

U.S. PATENT DOCUMENTS

2006/0285893 A1* 12/2006 Ishii .................. G03G 15/2039 399/329
2011/0129253 A1* 6/2011 Takahashi .......... G03G 15/2025 399/122

(Continued)

FOREIGN PATENT DOCUMENTS

JP 2021086093 A 6/2021

*Primary Examiner* — Arlene Heredia
*Assistant Examiner* — Laura Roth
(74) *Attorney, Agent, or Firm* — Alleman Hall & Tuttle LLP

(57) ABSTRACT

A fixing unit includes a plurality of first engagement portions which respectively engage with a plurality of first to-be-engaged portions to restrict a movement of a heating unit in a third direction intersecting with a first direction and a second direction. A fixed unit includes a second engagement portion which engages with a second to-be-engaged portion to restrict a movement of the heating unit in the first direction. The fixing unit includes a movable unit, a supporting member, and a reciprocating mechanism. The supporting member supports the movable unit such that the movable unit is movable along the first direction. The reciprocating mechanism causes the movable unit to reciprocate. The reciprocating mechanism causes the movable unit to reciprocate once every time a plurality of sheets pass between a first rotation member and a second rotation member in the fixing unit.

5 Claims, 5 Drawing Sheets

(56) References Cited

U.S. PATENT DOCUMENTS

| | | | | |
|---|---|---|---|---|
| 2012/0148304 | A1 * | 6/2012 | Sugaya | G03G 15/2053 399/329 |
| 2012/0155918 | A1 * | 6/2012 | Egi | G03G 15/2053 399/329 |
| 2014/0037308 | A1 * | 2/2014 | Nawa | G03G 15/2053 399/45 |
| 2014/0064788 | A1 * | 3/2014 | Mogi | G03G 15/2053 399/329 |
| 2017/0308010 | A1 * | 10/2017 | Okajima | G03G 15/2053 |
| 2021/0165352 | A1 | 6/2021 | Sato | |
| 2023/0195012 | A1 * | 6/2023 | Izumichi | G03G 21/1633 399/322 |
| 2023/0195013 | A1 * | 6/2023 | Izumichi | G03G 15/2035 |
| 2023/0288853 | A1 * | 9/2023 | Morita | G03G 15/2053 |
| 2023/0288854 | A1 * | 9/2023 | Ishida | G03G 15/2053 |

* cited by examiner

IMAGE FORMING APPARATUS INCLUDING RECIPROCATABLE FIXING UNIT NEXT TO HEATING UNIT

INCORPORATION BY REFERENCE

This application is based upon and claims the benefit of priority from the corresponding Japanese Patent Application No. 2022-036974 filed on Mar. 10, 2022, the entire contents of which are incorporated herein by reference.

BACKGROUND

The present disclosure relates to an electrophotographic image forming apparatus including a heating unit and a fixing unit.

In the electrophotographic image forming apparatus, a toner image is transferred onto a sheet from an image-carrying member, and the toner image is fixed onto the sheet by a fixing device. The fixing device includes a heater, a fixing member, and a pressure roller.

The fixing member and the pressure roller are each a rotation member. The heater heats the fixing member. The pressure roller biases the sheet toward the fixing member.

The fixing device may be sectioned into a heating unit including the heater and a fixing unit including the fixing member and the pressure roller.

SUMMARY

An image forming apparatus according to an aspect of the present disclosure includes a heating unit, a fixing unit, a unit bias portion, and a fixed unit. The heating unit includes a heater and is disposed along a first direction in a main body. The fixing unit includes a first rotation member that is heated by the heater and a second rotation member that biases a sheet toward the first rotation member, and is disposed next to the heating unit along the first direction in the main body. The fixed unit is fixed to the main body. The unit bias portion biases the heating unit toward the fixing unit. The unit bias portion retains a position of the heating unit with respect to the fixing unit in a second direction which is an array direction of the heating unit and the fixing unit. The heating unit includes a plurality of first to-be-engaged portions and a second to-be-engaged portion. The fixing unit includes a plurality of first engagement portions which respectively engage with the plurality of first to-be-engaged portions to restrict a movement of the heating unit in a third direction intersecting with the first direction and the second direction. The fixed unit includes a second engagement portion which engages with the second to-be-engaged portion to restrict a movement of the heating unit in the first direction. The fixing unit further includes a movable unit, a supporting member, and a reciprocating mechanism. The movable unit includes the first rotation member and the second rotation member. The supporting member supports the movable unit such that the movable unit is movable along the first direction. The reciprocating mechanism causes the movable unit to reciprocate along the first direction. The reciprocating mechanism causes the movable unit to reciprocate once every time a plurality of the sheets pass between the first rotation member and the second rotation member.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an embodied example of the present disclosure and does not limit the technical scope of the present disclosure.

[Configuration of Image Forming Apparatus 10]

An image forming apparatus 10 according to the embodiment executes print processing using electrophotography. The print processing is processing of forming an image on a sheet 900.

Figure 1:
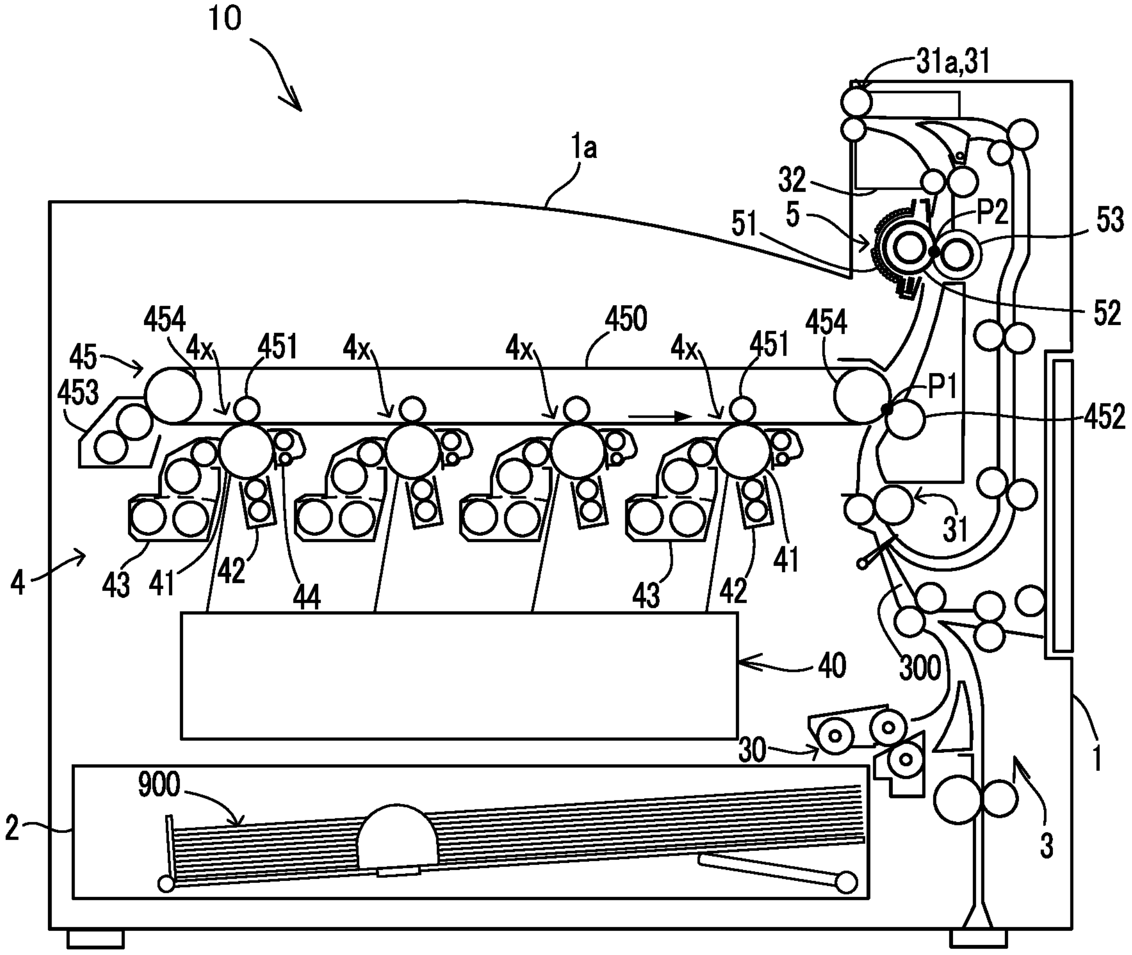
FIG. 1 is a configuration diagram of an image forming apparatus according to an embodiment.

As shown in FIG. 1, the image forming apparatus 10 includes a sheet storing portion 2, a sheet conveying device 3, and a printing device 4. The sheet conveying device 3 and the printing device 4 are housed in a main body 1 as a housing.

The sheet storing portion 2 is capable of storing a plurality of sheets 900. The sheet conveying device 3 includes a sheet feed device 30 and a plurality of conveying roller pairs 31.

The sheet feed device 30 feeds the sheets 900 in the sheet storing portion 2 one by one to a conveying path 300. The conveying path 300 is a path of the sheets 900.

The plurality of conveying roller pairs 31 convey the sheet 900 along the conveying path 300. The plurality of conveying roller pairs 31 include a discharge roller pair **31*a* (see FIG. 1). The discharge roller pair 31*a* discharges the sheet 900 formed with an image onto a discharge tray 1*a* from the conveying path 300**.

The printing device 4 executes the print processing on the sheet 900 conveyed along the conveying path 300. The image to be formed on the sheet 900 is a toner image.

The printing device 4 includes a laser scanning unit 40, one or more image forming portions **4*x*, a transfer device 45, and a fixing device 5. The image forming portion 4*x* includes a photoconductor 41, a charging device 42, a developing device 43, and a drum cleaning device 44**.

The charging device 42 charges a surface of the photoconductor 41. The laser scanning unit 40 scans beam light on the charged surface of the photoconductor 41. Thus, the laser scanning unit 40 forms an electrostatic latent image on the surface of the photoconductor 41.

By supplying toner to the surface of the photoconductor 41, the developing device 43 develops the electrostatic latent image into a toner image. The transfer device 45 transfers the toner image formed on the surface of the photoconductor 41 onto the sheet 900.

The transfer device 45 transfers the electrostatic latent image onto the sheet 900 at a transfer position P1 on the conveying path 300.

In the present embodiment, the printing device 4 is a tandem-type color printing device including a plurality of image forming portions 4x. Further, the transfer device 45 includes an intermediate transfer belt 450, a plurality of primary transfer devices 451, a secondary transfer device 452, and a belt cleaning device 453.

In the example shown in FIG. 1, the printing device 4 includes four image forming portions 4x respectively corresponding to toner of four colors, that is, yellow, magenta, cyan, and black. The transfer device 45 includes four primary transfer devices 451 respectively corresponding to the four image forming portions 4x.

The intermediate transfer belt 450 is rotatably supported by a plurality of supporting rollers 454. One of the plurality of supporting rollers 454 rotates by being driven by a belt drive device (not shown). Thus, the intermediate transfer belt 450 rotates.

Each of the primary transfer devices 451 transfers the toner image formed on the surface of the photoconductor 41 in the corresponding one of the image forming portions 4x onto a surface of the intermediate transfer belt 450. Thus, a synthetic toner image obtained by synthesizing the toner images of four colors is formed on the surface of the intermediate transfer belt 450.

The intermediate transfer belt 450 rotates while carrying the synthetic toner image. The secondary transfer device 452 transfers the synthetic toner image formed on the surface of the intermediate transfer belt 450 onto the sheet 900 at the transfer position P1.

The drum cleaning device 44 removes primary waste toner from the surface of the photoconductor 41. The primary waste toner is toner that remains on a part of the surface of the photoconductor 41, that has passed through the primary transfer device 451.

The belt cleaning device 453 removes secondary waste toner from the surface of the intermediate transfer belt 450. The secondary waste toner is toner that remains on a part of the surface of the intermediate transfer belt 450, that has passed through the secondary transfer device 452.

The fixing device 5 heats and pressurizes the synthetic toner image on the sheet 900 at a fixing position P2 on the conveying path 300. Thus, the fixing device 5 fixes the synthetic toner image onto the sheet 900. The fixing position P2 is a position on a downstream side of the transfer position P1 in a sheet conveying direction.

Figure 2:
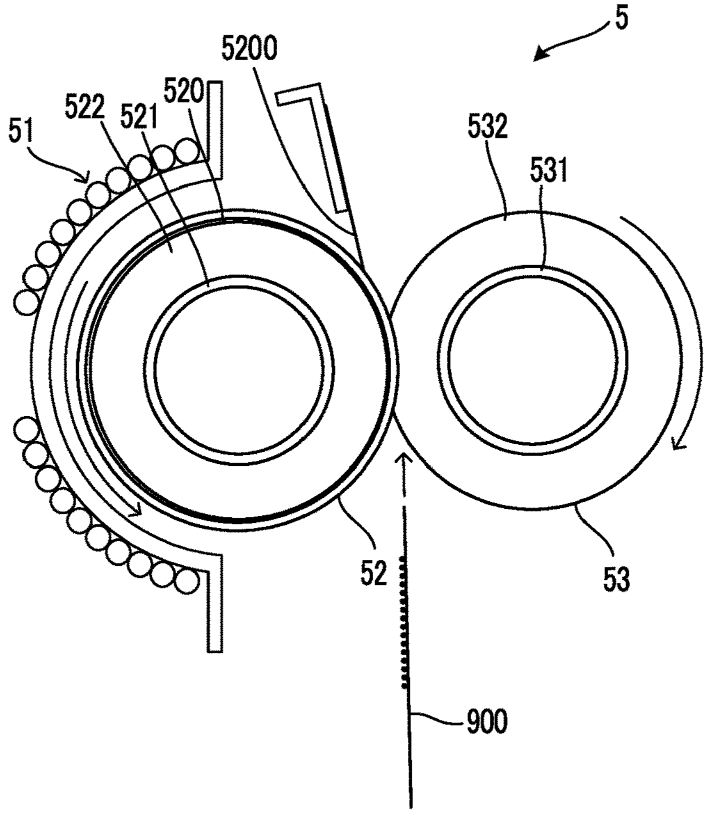
FIG. 2 is a diagram showing a configuration of a main portion of a fixing device in the image forming apparatus according to the embodiment.

As shown in FIG. 2, the fixing device 5 includes a heater 51, a fixing belt 52, a fixing roller 520, a pressure roller 53, and a sheet separation member 5200.

The fixing belt 52 is a flexible cylindrical member including the fixing roller 520 therein. The fixing belt 52 is heated by the heater 51.

The fixing roller 520 is a cylindrical member which supports the fixing belt 52 from an inner side of the fixing belt 52. The fixing roller 520 includes a cylindrical core metal portion 521 and an elastic portion 522 formed on an outer circumference of the core metal portion 521.

The fixing roller 520 is supported rotatably. The fixing belt 52 is capable of rotating with the fixing roller 520.

The fixing belt 52 includes a conductive base material, an elastic layer formed on an outer circumference of the base material, and a release layer formed on an outer circumference of the elastic layer.

The heater 51 is disposed so as to oppose an outer circumferential surface of the fixing belt 52. In the present embodiment, the heater 51 is a heating device that uses an induction heating system. The heater 51 mainly heats the base material of the fixing belt 52 by electromagnetic induction.

The pressure roller 53 is supported rotatably. Similar to the fixing roller 520, the pressure roller 53 also includes a cylindrical core metal portion 531 and an elastic portion 532 formed on an outer circumference of the core metal portion 531.

The pressure roller 53 rotates by being driven by a drive device (not shown). The fixing belt 52 and the fixing roller 520 rotate in conjunction with the pressure roller 53.

The fixing belt 52 heats the toner image formed on the sheet 900. The pressure roller 53 pressurizes the toner image toward the sheet 900.

It is noted that the fixing belt 52 is an example of a first rotation member that is heated by the heater 51. The pressure roller 53 is an example of a second rotation member that biases the sheet 900 toward the fixing belt 52.

The sheet separation member 5200 peels the sheet 900 off from the fixing belt 52 when the sheet 900 adheres onto the fixing belt 52.

The discharge roller pair 31a is capable of discharging the sheet 900 that has passed between the fixing belt 52 and the pressure roller 53 onto the discharge tray 1a (see FIG. 1).

Figure 4:
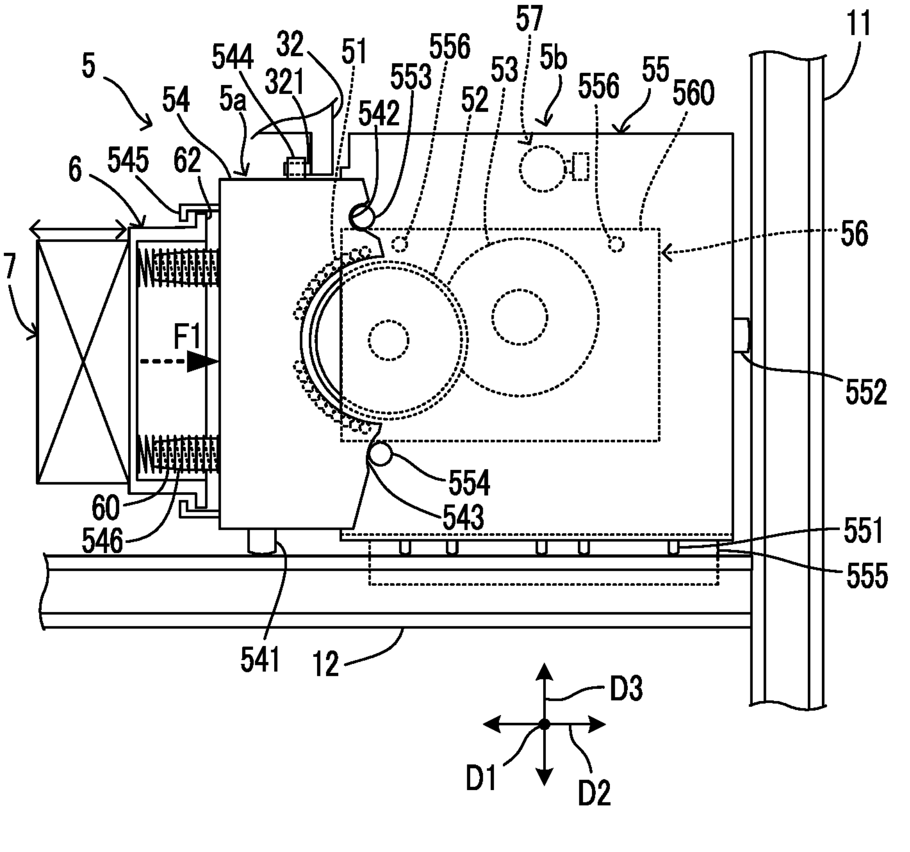
FIG. 4 is a side view showing a configuration of a heating unit and a peripheral portion thereof in the image forming apparatus according to the embodiment.
Figure 5:
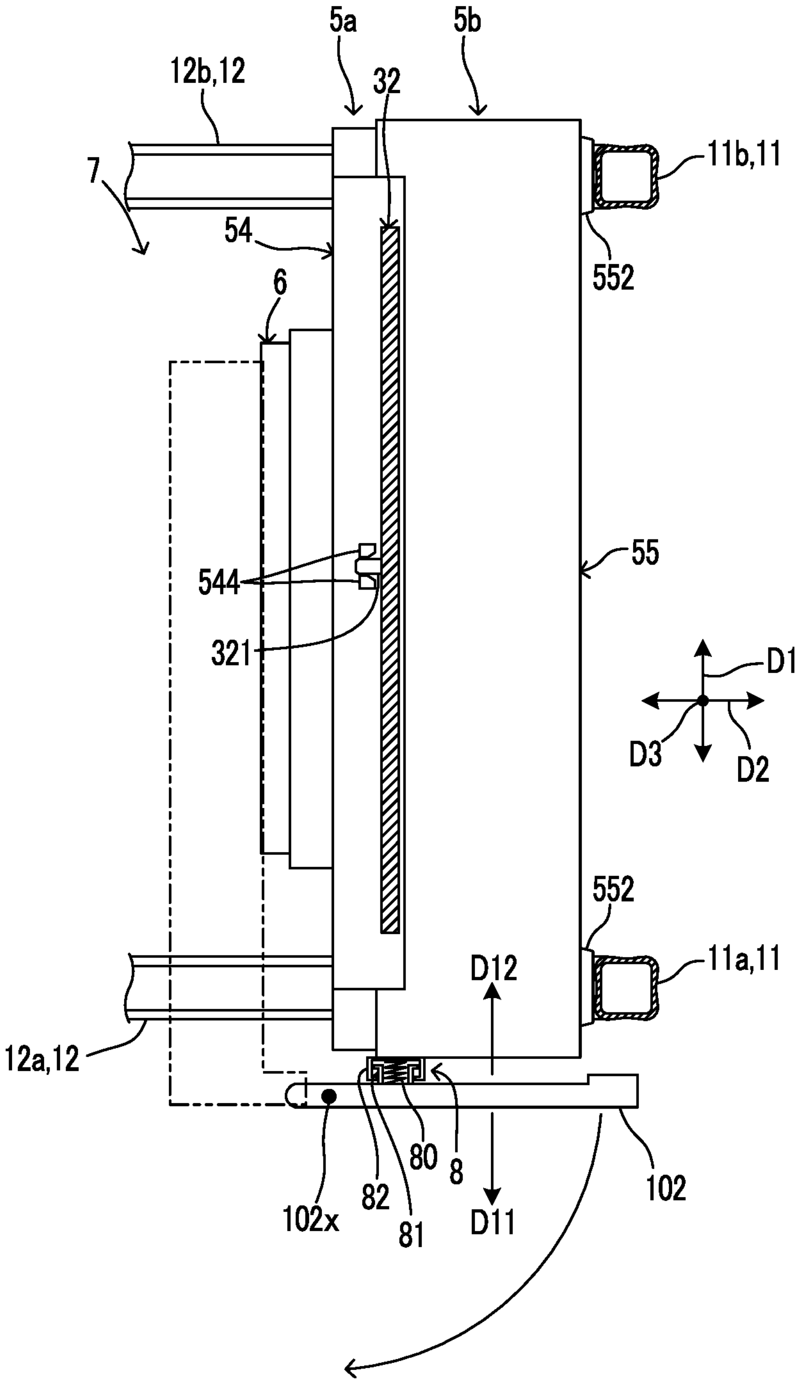
FIG. 5 is a plan view showing a configuration of the heating unit and the peripheral portion thereof in the image forming apparatus according to the embodiment.

In the present embodiment, the fixing device 5 is sectioned into a heating unit 5a and a fixing unit 5b (see FIG. 4 and FIG. 5). The heating unit 5a includes the heater 51. The fixing unit 5b includes the fixing belt 52 and the pressure roller 53. The fixing unit 5b is disposed next to the heating unit 5a.

Further, a discharge unit 32 is disposed above the fixing unit 5b (see FIG. 1). The discharge unit 32 includes the discharge roller pair 31a and a sheet guide member. The sheet guide member guides the sheet 900 conveyed from the fixing device 5 to the discharge roller pair 31a.

The discharge unit 32 is fixed to a main body frame 1x. The discharge unit 32 is an example of a fixed unit.

The heating unit 5a is disposed along a first direction D1 in the main body 1. The fixing unit 5b is also disposed along the first direction D1 in the main body 1.

In the present embodiment, the first direction D1 is a depth direction of the image forming apparatus 10. When the fixing unit 5b is attached to the main body 1, a direction along a center line of a rotation of the fixing belt 52 and the pressure roller 53 is the first direction D1.

The heating unit 5a and the fixing unit 5b are arranged next to each other in a second direction D2. In other words, the second direction D2 is an array direction of the heating unit 5a and the fixing unit 5b. The second direction D2 is a direction that intersects with the first direction D1.

By the heating unit 5a being moved to a position set apart from the fixing unit 5b, the fixing unit 5b can be drawn out from the main body 1.

Figure 7:
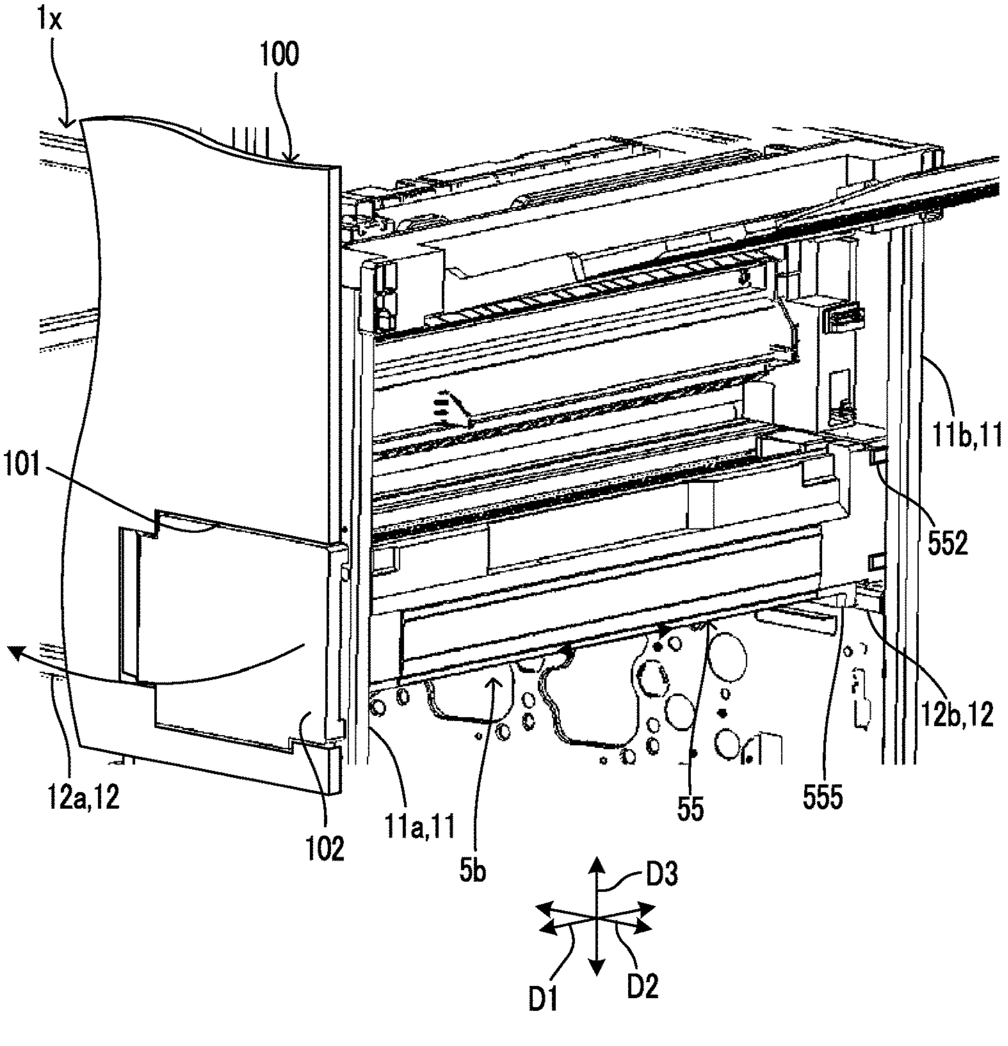
FIG. 7 is a perspective view showing peripheral parts of a fixing unit and a cover member in the image forming apparatus according to the embodiment.

An exterior member 100 includes an opening portion 101 and a cover member 102 (see FIG. 7). The opening portion 101 is a part where an opening that opens one end of the fixing unit 5b in the first direction D1 is formed.

The cover member 102 is supported by a supporting shaft 102x. Thus, the cover member 102 is rotatable about the supporting shaft 102x. The cover member 102 is rotatable between a closing position at which the opening portion 101 is closed and an opening position at which the opening portion 101 is opened.

When the fixing unit 5b is drawn out from the main body 1, the fixing unit 5b can pass through the opening portion 101 of the exterior member 100.

Incidentally, parts of the fixing belt 52 that come into contact with both side ends of the sheet 900 are likely to be more abraded than other parts of the fixing belt 52.

Further, for stably heating the fixing belt 52 by the heater 51, it is desirable to fix the heater 51 at a certain position. In a case where the heating device that uses an induction heating system is adopted as the heater 51, an effect of a positional change of the heater 51 on heating performance is particularly large.

The image forming apparatus 10 has a configuration in which the heater 51 is fixed at a certain position for reducing abrasion of the fixing belt 52. Hereinafter, this configuration will be described.

[Configurations of Heating Unit 5a and Fixing Unit 5b]

The heating unit 5a includes the heater 51 and a first supporting member 54. The first supporting member 54 is a member which supports the heater 51.

Figure 6:
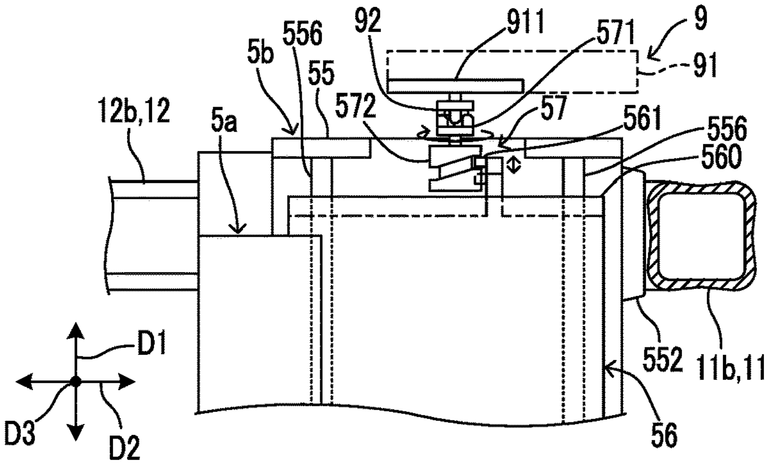
FIG. 6 is a diagram showing a configuration of a reciprocating mechanism in the image forming apparatus according to the embodiment.

The fixing unit 5b includes a second supporting member 55 and a movable unit 56 (see FIG. 4 and FIG. 6). The movable unit 56 includes a movable supporting member 560, the fixing belt 52, the fixing roller 520, and the pressure roller 53.

The movable supporting member 560 movably supports the fixing roller 520 and the pressure roller 53. The fixing roller 520 supports the fixing belt 52. In other words, the fixing belt 52 is supported by the movable supporting member 560 via the fixing roller 520.

The second supporting member 55 supports the movable unit 56 such that the movable unit 56 is movable along the first direction D1. For example, the second supporting member 55 includes a plurality of supporting shafts 556 arranged along the first direction D1 (see FIG. 4 and FIG. 6). The plurality of supporting shafts 556 support the movable supporting member 560 such that the movable supporting member 560 is slidable along the first direction D1.

The fixing unit 5b further includes a reciprocating mechanism 57 which causes the movable unit 56 to reciprocate along the first direction D1 (see FIG. 6). A configuration of the reciprocating mechanism 57 will be described later.

[Mechanism for Positioning Heating Unit 5a and Fixing Unit 5b]

Figure 3:
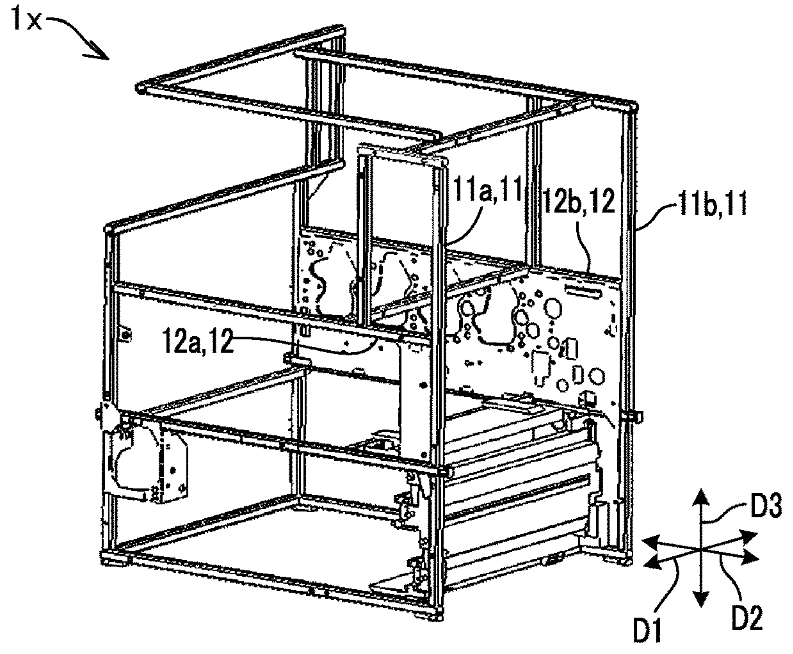
FIG. 3 is a perspective view of a main body frame in the image forming apparatus according to the embodiment.

The image forming apparatus 10 includes the main body frame 1x and the exterior member 100 (see FIG. 3 and FIG. 7). The main body frame 1x forms a framework of the main body 1. The exterior member 100 forms an exterior of the main body 1.

The main body frame 1x is constituted by a combination of a plurality of metal pipes (see FIG. 3). The heating unit 5a and the fixing unit 5b are supported by the main body frame 1x.

The exterior member 100 is attached to the main body frame 1x (see FIG. 7). The exterior member 100 forms an exterior of the image forming apparatus 10.

The plurality of metal pipes constituting the main body frame 1x include two supporting column portions 11 and two beam portions 12 (see FIG. 3).

The two supporting column portions 11 are formed to extend in a longitudinal direction D3 and are spaced apart from each other in the first direction D1 (see FIG. 3). The longitudinal direction D3 is an up-down direction.

The two supporting column portions 11 are formed next to the fixing unit 5b while extending in the longitudinal direction D3 (see FIG. 4 and FIG. 7).

The two supporting column portions 11 include a first supporting column portion 11a disposed on a front surface side of the image forming apparatus 10 and a second supporting column portion 11b disposed on a back surface side of the image forming apparatus 10 (see FIG. 3).

The two beam portions 12 are formed to extend in a lateral direction below the heating unit 5a and the fixing unit 5b, and are spaced apart from each other in the first direction D1 (see FIG. 3 and FIG. 4). The lateral direction is a width direction of the image forming apparatus 10.

The two beam portions 12 are respectively connected to the two supporting column portions 11 (see FIG. 3). For example, the two beam portions 12 are respectively connected to the two supporting column portions 11 by welding.

The two beam portions 12 include a first beam portion 12a disposed on the front surface side of the image forming apparatus 10 and a second beam portion 12b disposed on the back surface side of the image forming apparatus 10 (see FIG. 3).

The fixing unit 5b is disposed between the heating unit 5a and the two supporting column portions 11 (see FIG. 3).

The first supporting member 54 of the heating unit 5a is placed on the two beam portions 12 while being bridged between the two beam portions 12. Similarly, the second supporting member 55 of the fixing unit 5b is placed on the two beam portions 12 while being bridged between the two beam portions 12.

In other words, neither the heating unit 5a nor the fixing unit 5b is fixed to the main body frame 1x by a fixture such as a screw.

The heating unit 5a and the fixing unit 5b are placed on the two beam portions 12 in a state where longitudinal directions thereof are set along the first direction D1 (see FIG. 4 and FIG. 5).

The image forming apparatus 10 further includes an action member 6, first springs 60, and an interlocking mechanism 7 (see FIG. 4 and FIG. 5). The action member 6 and the first springs 60 are arranged inside the main body 1.

The first supporting member 54 of the heating unit 5a includes a plurality of first to-be-engaged portions 542 and a second to-be-engaged portion 544 (see FIG. 4 and FIG. 5). The first supporting member 54 further includes a plurality of unit contact portions 543 (see FIG. 4).

The second supporting member 55 of the fixing unit 5b includes a plurality of first engagement portions 553 respectively corresponding to the plurality of first to-be-engaged portions 542 (see FIG. 4). The second supporting member 55 further includes a plurality of to-be-contacted portions 554 respectively corresponding to the plurality of unit contact portions 543 (see FIG. 4).

In the present embodiment, the first supporting member 54 includes a pair of first to-be-engaged portions 542 respectively formed at two positions set apart from each other in the first direction D1. The second supporting member 55 includes a pair of first engagement portions 553 formed at two positions respectively corresponding to the pair of first to-be-engaged portions 542.

In the present embodiment, each of the first to-be-engaged portions 542 has a concave shape opened in the second direction D2 (see FIG. 4). Moreover, each of the first engagement portions 553 has a convex shape that fits into the first to-be-engaged portion 542.

It is noted that each of the first to-be-engaged portions 542 may have a convex shape. In this case, each of the first engagement portions 553 has a concave shape that is opened in the second direction D2.

Furthermore, the discharge unit 32 includes a second engagement portion 321 corresponding to the second to-be-engaged portion 544 (see FIG. 4 and FIG. 5). The discharge unit 32 is an example of a fixed unit fixed to the main body 1.

The pair of first engagement portions 553 respectively engage with the pair of first to-be-engaged portions 542 to restrict a movement of the heating unit 5*a* in the longitudinal direction D3. The longitudinal direction D3 is an example of a third direction intersecting with the first direction D1 and the second direction D2.

The second engagement portion 321 of the discharge unit 32 engages with the second to-be-engaged portion 544 to restrict a movement of the heating unit 5*a* in the first direction D1.

In the present embodiment, the second engagement portion 321 has a convex shape formed along the second direction D2 (see FIG. 4 and FIG. 5). The second to-be-engaged portion 544 is a pair of erected portions opposing each other in the first direction D1 (see FIG. 5). The second engagement portion 321 is inserted between the pair of erected portions of the second to-be-engaged portion 544. Thus, the second engagement portion 321 engages with the second to-be-engaged portion 544.

The first springs 60 are an example of an elastic member. The first springs 60 are arranged on a side opposite to the fixing unit 5*b* side from the heating unit 5*a* in the main body 1 (see FIG. 4). For example, the first springs 60 are supported by protrusion portions 546 provided in the first supporting member 54.

The action member 6 and the heating unit 5*a* sandwich the first springs 60 (see FIG. 4). The first springs 60 bias the first supporting member 54 toward the second supporting member 55 by an elastic force (see FIG. 4). Thus, the first springs 60 retain the position of the heating unit 5*a* with respect to the fixing unit 5*b* in the second direction D2. The first springs 60 are an example of a unit bias member.

A bias force F1 of the first springs 60 with respect to the first supporting member 54 is larger than a static frictional force of the heating unit 5*a* and the fixing unit 5*b* with respect to the two beam portions 12 (see FIG. 4).

The first supporting member 54 includes one or more ribs 541 that come into contact with upper surfaces of the two beam portions 12. Similarly, the second supporting member 55 includes a plurality of ribs 551 that come into contact with the upper surfaces of the two beam portions 12. The ribs 541 of the first supporting member 54 and the ribs 551 of the second supporting member 55 are provided for reducing the static frictional force.

By biasing the first supporting member 54, the first springs 60 cause the first supporting member 54 to come into contact with the second supporting member 55.

In the present embodiment, the pair of first to-be-engaged portions 542 come into contact with the pair of first engagement portions 553 by a bias force of the first springs 60. Specifically, inner surfaces of the concave shape portions of the pair of first to-be-engaged portions 542 respectively come into contact with the pair of first engagement portions 553 (see FIG. 4).

In addition, the pair of unit contact portions 543 come into contact with the pair of to-be-contacted portions 554 by the bias force of the first springs 60. In the present embodiment, each of the pair of unit contact portions 543 is a curved surface. Each of the pair of to-be-contacted portions 554 has a convex shape formed along the first direction D1.

The pair of unit contact portions 543 are respectively formed at two positions set apart from the pair of first to-be-engaged portions 542 in the longitudinal direction D3 (see FIG. 4). In other words, the pair of first to-be-engaged portions 542 and the pair of unit contact portions 543 respectively come into contact with the fixing unit 5*b* at four positions. As a result, an attitude of the heating unit 5*a* is stabilized.

Further, by biasing the first supporting member 54, the first springs 60 cause the second supporting member 55 to come into contact with the two supporting column portions 11. In other words, the first springs 60 bias the second supporting member 55 via the first supporting member 54.

Moreover, the second supporting member 55 includes a plurality of column contact portions 552 protruding toward the two supporting column portions 11 (see FIG. 4 and FIG. 5). The plurality of column contact portions 552 respectively come into contact with side surfaces of the two supporting column portions 11.

By the second engagement portion 321 engaging with the second to-be-engaged portion 544, the heating unit 5*a* is positioned at a target position in the first direction D1.

Further, by being sandwiched between the first springs 60 and the two supporting column portions 11, the heating unit 5*a* and the fixing unit 5*b* are positioned at target positions in the second direction D2.

Furthermore, the first springs 60 bias the heating unit 5*a* toward the fixing unit 5*b* by an elastic force. Thus, a situation where a mechanical allowance of the interlocking mechanism 7 to be described later adversely affects the positioning of the heating unit 5*a* is avoided.

In addition, by the pair of first engagement portions 553 engaging with the pair of first to-be-engaged portions 542, the heating unit 5*a* is positioned at a target position in the longitudinal direction D3.

The interlocking mechanism 7 causes the action member 6 to move along the second direction D2 according to an operation to a predetermined operation portion. For example, the cover member 102 also serves as the operation portion.

By operating in conjunction with the movement of the operation portion, the interlocking mechanism 7 causes the action member 6 to move from one of the first position and the second position to the other one of the first position and the second position.

When the action member 6 is at the first position, the heating unit 5*a* is positioned at a reference position in the second direction D2 by the bias force of the first springs 60. The second position is a position farther away from the fixing unit 5*b* than the first position.

The interlocking mechanism 7 causes the action member 6 to move from the first position to the second position according to a first operation made to the operation portion. For example, the first operation is an operation of moving the cover member 102 from the closing position to the opening position.

The first supporting member 54 of the heating unit 5*a* includes to-be-engaged portions 545 which engage with a part of the action member 6 (see FIG. 4).

The action member 6 includes engagement portions 62 capable of engaging with the to-be-engaged portions 545 of the first supporting member 54 (see FIG. 4). While the action member 6 moves from the first position to the second position, the engagement portions 62 engage with the to-be-engaged portions 545.

When the action member 6 moves from the first position to the second position, the heating unit 5*a* moves from the reference position to the evacuation position by a force received from the action member 6 via the engagement portions 62. The evacuation position is a position farther away from the fixing unit 5*b* than the reference position.

When the heating unit 5*a* is positioned at the evacuation position, the fixing unit 5*b* can be drawn out from the main body 1 in a detachment direction D11 (see FIG. 5). The fixing unit 5*b* is drawn out from the main body 1 without coming into contact with the heating unit 5*a*. The detachment direction D11 is a direction along the first direction D1.

In addition, the interlocking mechanism 71 causes the action member 6 to move from the second position to the first position according to a second operation made to the operation portion. For example, the second operation is an operation of moving the cover member 102 from the opening position to the closing position.

When the action member 6 moves from the second position to the first position, the heating unit 5*a* moves from the evacuation position to the reference position by the bias force of the first springs 60.

While the heating unit 5*a* moves from the evacuation position to the reference position, the second engagement portion 321 engages with the second to-be-engaged portion 544. In addition, when the heating unit 5*a* reaches the reference position, the pair of first engagement portions 553 engage with the pair of first to-be-engaged portions 542.

Furthermore, when the heating unit 5*a* reaches the reference position, the pair of unit contact portions 543 come into contact with the pair of to-be-contacted portions 554. Thus, the heating unit 5*a* is positioned at the reference position.

Moreover, the image forming apparatus 10 further includes a cover bias mechanism 8 attached to an inner surface of the cover member 102 (see FIG. 5). Further, the second supporting member 55 of the fixing unit 5*b* includes a beam contact portion 555 protruding downwardly from the lower surface thereof (see FIG. 4 and FIG. 7).

The cover bias mechanism 8 includes a second spring 80, a spring case 81, and a cap portion 82 (see FIG. 5).

The spring case 81 houses the second spring 80. The cap portion 82 is movably attached to the spring case 81. The second spring 80 is an example of an elastic fixing unit bias member.

When the cover member 102 is at the closing position, the second spring 80 is sandwiched between the cover member 102 and the second supporting member 55 of the fixing unit 5*b*. In the present embodiment, the second spring 80 and the cap portion 82 are sandwiched between the cover member 102 and the second supporting member 55.

By being sandwiched between the cover member 102 and the second supporting member 55, the second spring 80 biases the second supporting member 55 in an attachment direction D12 by an elastic force (see FIG. 5). The attachment direction D12 is a direction opposite to the detachment direction D11.

Further, the beam contact portion 555 comes into contact with one of the side surfaces of the two beam portions 12 by a force that the second supporting member 55 receives from the second spring 80 when the cover member 102 is at the closing position. In the present embodiment, the beam contact portion 555 comes into contact with the side surface of the second beam portion 12*b*.

By the actions of the second spring 80 and the beam contact portion 555, the fixing unit 5*b* is positioned in the first direction D1.

It is noted that the cover bias mechanism 8 may be attached to the second supporting member 55 of the fixing unit 5*b*.

As described above, the reciprocating mechanism 57 causes the movable unit 56 to reciprocate along the first direction D1. Moreover, the image forming apparatus 10 further includes a drive mechanism 9 disposed in the main body 1 (see FIG. 6). The drive mechanism 9 is fixed to the main body frame 1*x*.

The drive mechanism 9 includes a reduction gear mechanism 91 including an output gear 911, and an output engagement portion 92. The output engagement portion 92 is formed integrally with the output gear 911. The output engagement portion 92 rotates at the same speed as the output gear 911.

The reduction gear mechanism 91 transmits a rotational force of a motor (not shown) to the output gear 911 while decelerating it. The output engagement portion 92 is a rotation member which transmits the rotational force to the fixing unit 5*b*. The output engagement portion 92 is an example of a drive rotation member.

The reciprocating mechanism 57 includes an input engagement portion 571 and a cylindrical cam 572. The input engagement portion 571 engages with the output engagement portion 92. The input engagement portion 571 transmits a rotational force of the output engagement portion 92 to the cylindrical cam 572.

The movable unit 56 of the fixing unit 5*b* includes a cam engagement portion 561 which engages with the cylindrical cam 572. By the rotation of the cylindrical cam 572, the cam engagement portion 561 reciprocates along the first direction D1.

By the cam engagement portion 561 reciprocating along the first direction D1, the entire movable unit 56 reciprocates along the first direction D1. In other words, the reciprocating mechanism 57 converts the rotational movement of the output engagement portion 92 into a reciprocating movement of the movable unit 56.

The reciprocating mechanism 57 causes the movable unit 56 to reciprocate once every time a plurality of sheets 900 pass between the fixing belt 52 and the pressure roller 53.

For example, a movement range of the movable unit 56 in the first direction D1 is approximately 3 millimeters to 10 millimeters.

For example, the reciprocating mechanism 57 causes the movable unit 56 to move approximately 0.02 millimeters to 0.08 millimeters every time one sheet 900 passes through the fixing device 5.

By adopting the image forming apparatus 10, the heating unit 5*a* including the heater 51 is fixed at a certain position. Furthermore, by the action of the reciprocating mechanism 57, positions of the fixing belt 52 that come into contact with both side ends of the sheet 900 change as necessary. As a result, abrasion of the fixing belt 52 is reduced.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a heating unit which includes a heater and is disposed to extend along a first direction in a main body;

a fixing unit which includes a first rotation member that is heated by the heater and a second rotation member that biases a sheet toward the first rotation member, and is disposed next to the heating unit to extend along the first direction in the main body;

a unit bias portion which biases the heating unit toward the fixing unit; and a fixed unit fixed to the main body, wherein the unit bias portion retains a position of the heating unit with respect to the fixing unit at a reference position in a second direction along which the heating unit and the fixing unit are arranged, the heating unit includes a plurality of first to-be-engaged portions and a second to-be-engaged portion, the fixing unit includes a plurality of first engagement portions which respectively engage with the plurality of first to-be-engaged portions to restrict a movement of the heating unit in a third direction intersecting with the first direction and the second direction, the fixed unit includes a second engagement portion which engages with the second to-be-engaged portion to restrict a movement of the heating unit in the first direction, the fixing unit further includes:

a movable unit including the first rotation member and the second rotation member, a supporting member which supports the movable unit such that the movable unit is movable along the first direction, and a reciprocating mechanism which causes the movable unit to reciprocate along the first direction, the reciprocating mechanism causes the movable unit to reciprocate once every time a plurality of the sheets pass between the first rotation member and the second rotation member, and when the heating unit moves from a position farther away from the fixing unit than the reference position to the reference position along the second direction under a bias force of the unit bias portion, the first engagement portions move from positions of not engaging with the first to-be-engaged portions to positions of engaging with the first to-be-engaged portions, respectively, and the second engagement portion moves from a position of not engaging with the second to-be-engaged portion to a position of engaging with the second to-be-engaged portion.

2. The image forming apparatus according to claim 1, further comprising a drive mechanism which is disposed in the main body and includes a drive rotation member that transmits a rotational force to the fixing unit, wherein the reciprocating mechanism converts a rotational movement of the drive rotation member into a reciprocating movement of the movable unit.

3. The image forming apparatus according to claim 1, wherein the fixed unit is a discharge unit including a discharge roller pair which is capable of discharging the sheets that have passed between the first rotation member and the second rotation member onto a discharge tray.

4. The image forming apparatus according to claim 1, wherein the heating unit includes a pair of the first to-be-engaged portions respectively formed at two positions set apart from each other in the first direction, the fixing unit includes a pair of the first engagement portions formed at two positions respectively corresponding to the pair of first to-be-engaged portions, the heating unit includes a pair of contact portions respectively formed at two positions set apart from the pair of first to-be-engaged portions in the third direction, the pair of first to-be-engaged portions come into contact with the pair of first engagement portions by the bias force of the unit bias portion, and the pair of contact portions come into contact with the fixing unit by the bias force of the unit bias portion.

5. The image forming apparatus according to claim 1, wherein the heater is a heating device which uses an induction heating system.

* * * * *